J. M. STRYKER.

BAG TIE.

APPLICATION FILED JUNE 28, 1909.

Reissued Aug. 31, 1909.

13,017.

Witnesses:
Frank O. Blanchard
J. S. Abbott

Inventor:
James M. Stryker
By Burton & Burton
Attorneys.

ANDREW. B. GRAHAM CO., PHOTO-LITHOGRAPHERS, WASHINGTON, D. C

UNITED STATES PATENT OFFICE.

JAMES M. STRYKER, OF CHICAGO, ILLINOIS.

BAG-TIE.

13,017. Specification of Reissued Letters Patent. Reissued Aug. 31, 1909.

Original No. 915,503, dated March 16, 1909, Serial No. 375,628. Application for reissue filed June 28, 1909. Serial No. 504,952.

*To all whom it may concern:*

Be it known that I, JAMES M. STRYKER, a citizen of the United States, residing at Chicago, in the county of Cook and State of Illinois, have invented new and useful Improvements in Bag-Ties, of which the following is a specification, reference being had to the accompanying drawings, forming a part thereof.

The purpose of this invention is to provide an improved tie for paper bags of the type or class in which the tie is secured to the bag, the specific purposes of the invention being to diminish the liability of tearing the bag by strain on the tie or by accidental pull in direction tending to detach the tie, and to overcome the objection that such ties, when made of cord, interfere with the printing of the label or other matter on the bag.

The invention consists in the features of construction having these purposes which are described and shown as set out in the claims.

Figure 1:
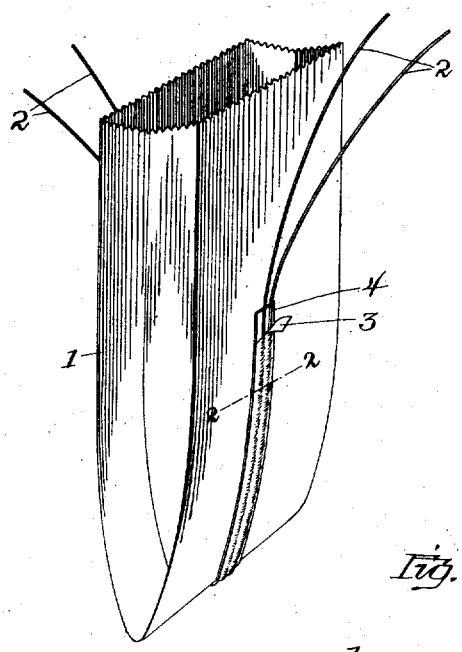
Figure 2:
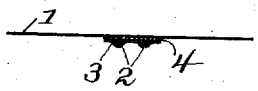

In the drawings:—Figure 1 is a perspective view of a bag having my improved tie. Fig. 2 is an exaggerated detail section at the line 2—2 on Fig. 1.

To a paper bag, 1, of ordinary construction and design, I secure my improved tie, which comprises a cord or cords, 2, which are inclosed by a sheath or cover preferably made of a strip, 3, preferably of relatively thin or tender paper, and a strip, 4, preferably of relatively heavy or tough paper, pasted together and embracing the cord or cords so as to make a flat strap-like device, the back or inner side of which,—that is, the side which is to be applied to the bag,—being preferably formed by the heavier reinforcing strip, 4, which is secured to the bag preferably by a cement, such as glue, which is tougher or more tenacious than the paste used to secure the two strips together. The length of the envelop and reinforcing element described should be made such as to extend across the bottom of the bag and up on two opposite sides to a point as high as the bag will stand when filled as full as will allow sufficient extent above the contents to fold in and cover the same, so that the cord ends, when drawn across the top of the bag from the two opposite sides, for tying, will be guarded from the bag and prevented from cutting into the latter by the envelop and reinforce interposed between the cord and the bag. If the bag is not entirely filled to the height to which the reinforce and envelop extend, as described, the envelop alone being light compared with the reinforce, will permit the cord to be stripped out, back to the point at which the cords will intertwist for tying the knot, and the excess of length of the reinforce will be filled with the portion of the bag which is folded in at the top to close it, however great that portion may be. The relative lightness of the outer cover or sheath, 3, as compared with the inner reinforcing strip, 4, and particularly as compared with that strip added to the material of the bag and further reinforced by the tougher cement which secures it to the bag, causes any accidental pull or jerk of the cord which would tend to tear it away from the bag to tear it out through the outer sheath or covering strip, 3, thus avoiding the tearing of the bag, as would be liable to happen in the absence of the inner or reinforcing strip, 4, interposed between the cord and the bag.

In making this tie, after inclosing the cord in the envelop it may be passed between the rolls or subjected to other means for flattening the cord, and this being done while the paste which secures the envelop about it is soft and while the cord is also softened by the paste, will easily render substantial cord thoroughly flat without materially diminishing its strength; and the tie, when completed and secured upon the bag thus presents no abrupt protruding line through the face of the type or cut which may be employed to imprint it, and by using a suitably cushioned platen in printing, the tie constitutes no material impediment to a perfect imprint.

It should be understood that the relative toughness of the inner strip which reinforces the bag under or back of the cord may be obtained either by the character of the strip itself, being thicker or of tougher material than the outer strip, or by means of the cement which secures it to the bag, whose toughness constitutes an element of resistance to tearing which is added to that of the strip itself to make the total resistance to tearing greater than that of the outer strip assisted by the weaker paste which secures it to the bag. In the claims, therefore, the terms "light" and "heavy", applied to the paper strips, are to be understood as indicating relative toughness of the two strips in view of both their character and reinforcement by the adhesives used to secure them respectively.

I claim:—

1. A paper bag having a tie secured thereto, the tie comprising a cord; a rupturable relatively light paper outer cover or sheath for such cord and a relatively heavy reinforce or backing adherent to the light sheath and to the outer surface of the bag.

2. A paper bag having a tie secured thereto, the tie comprising a flattened cord or cords; a relatively light paper outer cover or sheath for the same and a relatively heavy paper reinforce interposed between the outer cover or sheath and the bag and adherent to both.

3. A paper bag having a tie secured thereto, the tie comprising a cord; a rupturable paper outer cover or sheath for such cord and a reinforce or backing for the same adherent to the sheath and to the outer surface of the bag, the adhesive for securing the reinforce or backing to the bag being tougher than the adhesive for securing the outer sheath to the reinforce.

4. A paper bag having a tie secured thereto, the tie comprising a reinforce or backing strip adherent to the outer surface of the bag; a rupturable paper sheath adherent to such outer surface of such reinforce or backing, and a cord inclosed between the reinforce and sheath fixedly adherent to one of said inclosing elements.

In testimony whereof, I have hereunto set my hand, in the presence of two witnesses, at Chicago, Illinois, this 25th day of June, 1909.

JAMES M. STRYKER.

In the presnce of—
JULIA S. ABBOTT,
M. GERTRUDE ADY.